US009756507B2

(12) United States Patent
Peterson et al.

(10) Patent No.: US 9,756,507 B2
(45) Date of Patent: *Sep. 5, 2017

(54) SYSTEM AND METHODS FOR OBTAINING UBIQUITOUS NETWORK COVERAGE

(71) Applicant: LEVEL 3 COMMUNICATIONS, LLC, Broomfield, CO (US)

(72) Inventors: Benjamin K. Peterson, Superior, CO (US); Samid Ameer Hoda, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,046

(22) Filed: Jul. 11, 2016

(65) Prior Publication Data
US 2016/0323752 A1 Nov. 3, 2016

Related U.S. Application Data

(63) Continuation of application No. 13/707,381, filed on Dec. 6, 2012, now Pat. No. 9,392,466.

(51) Int. Cl.
*H04W 40/00* (2009.01)
*H04W 16/18* (2009.01)
*G06F 3/0484* (2013.01)

(52) U.S. Cl.
CPC ........ *H04W 16/18* (2013.01); *G06F 3/04847* (2013.01)

(58) Field of Classification Search
CPC ...... G06F 17/5009; G06F 17/50; G06F 3/016; G06F 17/5081; G06F 3/038; G06F 3/14; H04W 24/02; H04W 16/18; H04W 84/12; H04W 52/146; H04W 52/325;
(Continued)

(56) References Cited

U.S. PATENT DOCUMENTS

| D394,051 S | 5/1998 | Smith |
|---|---|---|
| 7,490,014 B1 | 2/2009 | Koren et al. |
| D636,406 S | 4/2011 | Mays et al. |

(Continued)

OTHER PUBLICATIONS

European Examination Report, dated Jun. 24, 2016, Application No. 12889471.4, filed Dec. 7, 2012; 8 pgs.
(Continued)

*Primary Examiner* — Kwasi Karikari

(57) ABSTRACT

Implementations described and claimed herein provide a system and methods for determining a minimum number of communication nodes to substantially cover a particular geographical area and for optimizing an extension of an optical network to provide service to the communication nodes. In one implementation, at least one parameter for one or more forces configured to control interactions of a plurality of nodes is received. Each of the nodes has a node range corresponding to an effective operational limit of the node. Boundary information defining a geographical area to which coverage by a network may be provided is received. The one or more forces are simulated to distribute the plurality of nodes. The simulation of the one or more forces causes the plurality of nodes to become positioned in an overall layout such that the defined geographical area is substantially covered by the node ranges.

16 Claims, 16 Drawing Sheets

(58) Field of Classification Search
CPC ... H04W 64/003; H04W 16/20; H04W 24/10; H04W 36/30
USPC .......................................................... 455/446
See application file for complete search history.

(56) References Cited

U.S. PATENT DOCUMENTS

| | | | |
|---|---|---|---|
| 8,185,824 | B1 | 5/2012 | Mitchell et al. |
| D663,744 | S | 7/2012 | Tanghe et al. |
| D664,989 | S | 8/2012 | Yang et al. |
| D685,391 | S | 7/2013 | Blissenbach et al. |
| D692,908 | S | 11/2013 | Glaeske et al. |
| 8,612,360 | B1 | 12/2013 | Singer |
| D706,812 | S | 6/2014 | Peterson et al. |
| 9,392,466 | B2 * | 7/2016 | Peterson ............ G06F 3/04847 |
| 2004/0259554 | A1 * | 12/2004 | Rappaport ............ H04W 16/18 455/446 |
| 2007/0064784 | A1 * | 3/2007 | Dehghan ............... H04W 24/00 375/224 |
| 2008/0162260 | A1 | 7/2008 | Rohan et al. |
| 2009/0254874 | A1 | 10/2009 | Bose |
| 2010/0014496 | A1 | 1/2010 | Kalika et al. |
| 2010/0086306 | A1 | 4/2010 | D'Alessandro et al. |
| 2010/0098036 | A1 | 4/2010 | Li |
| 2010/0298022 | A1 | 11/2010 | Karim et al. |
| 2011/0003597 | A1 | 1/2011 | Budic et al. |
| 2011/0119222 | A1 | 5/2011 | Rosinski |
| 2014/0161465 | A1 | 6/2014 | Peterson et al. |

OTHER PUBLICATIONS

International Search Report, dated Feb. 26, 2013, In't Appl. No. PCT/US12/068588, Int'l Filing date Dec. 7, 2012, 4 pgs.
Written Opinion, dated Feb. 26, 2013, In't Appl. No. PCT/US12/068588, Int'l Filing date Dec. 7, 2012, 7 pgs.
Chen, J. et al., "Novel Deployment Schemes for Mobile Sensor Networks", [retrieved on Jan. 25, 2013] Retrieved from the Internet <URL:http//www.mdpi.com/1424-8220/7/11/2907> Nov. 21, 2007, 2907-2919.
Dirafzoon, A. et al., "Virtual Force Based Individual Particle Optimization for Coverage in Wireless Sensor Networks", *Electrical and Computer Engineering (CCECE)* 2010 23rd anadian Conference on IEEE, XP031755113 May 2, 2010, pp. 1-4.
Panditharathne, C. et al., "Enhanced Virtual Forces Algorithm with Boundary Forces (EVFA-B)", Technical Report 2010, [retrieved on Jan. 25, 2013] Retrieved from the Internet <URL:http://bunlab.twbbs.org/filezone/files/EVFA-B.pdf>, 13 pgs.
Wang, Y-C et al., "Efficient Deployment Algorithms for Ensuring Coverage and Connectivity of Wireless Sensor Networks", *Advanced Information Networking and Applications* [retrieved on Jan. 25, 2013] Retrieved from the Internet <http://ieeexplore.ieee.org/xpls/abs_all.jsp?amumber=1283891> 2004, 8 pgs.
Wang, Xue et al., "Virtual Force-Directed Particle Swarm Optimization for Dynamic Deployment in Wireless Sensor Networks", *Advanced Intelligent Computing Theories and Applications, with Aspects of Theoretical and Methodological Issues* XP019066801 Aug. 21, 2007, pp. 292-303.
Wong, T. et al., "A self-organizing technique for sensor placement in wireless micro-sensor networks", *Advanced Information Networking and Applications* [retrieved on Jan. 25, 2013] Retrieved from the internet <URL:http//ieeexplore.ieee.org/xpls/abs_all.jsp?amumber=1283891> 2004, 7 pgs.
Zou, Y et al., "Sensor Deployment and Target Localization Based on Virtual Forces", in Proceedings of the 21st Annual Joint Conference of the IEEE Computer and Communications Societies (INFOCOM '03) [retrieved on Jan. 25, 2013] Retrieved from the Internet <URL:http://www.ieee-infocom.org/2003/papers/32_01.PDF> 2003, 1293-1303.

* cited by examiner

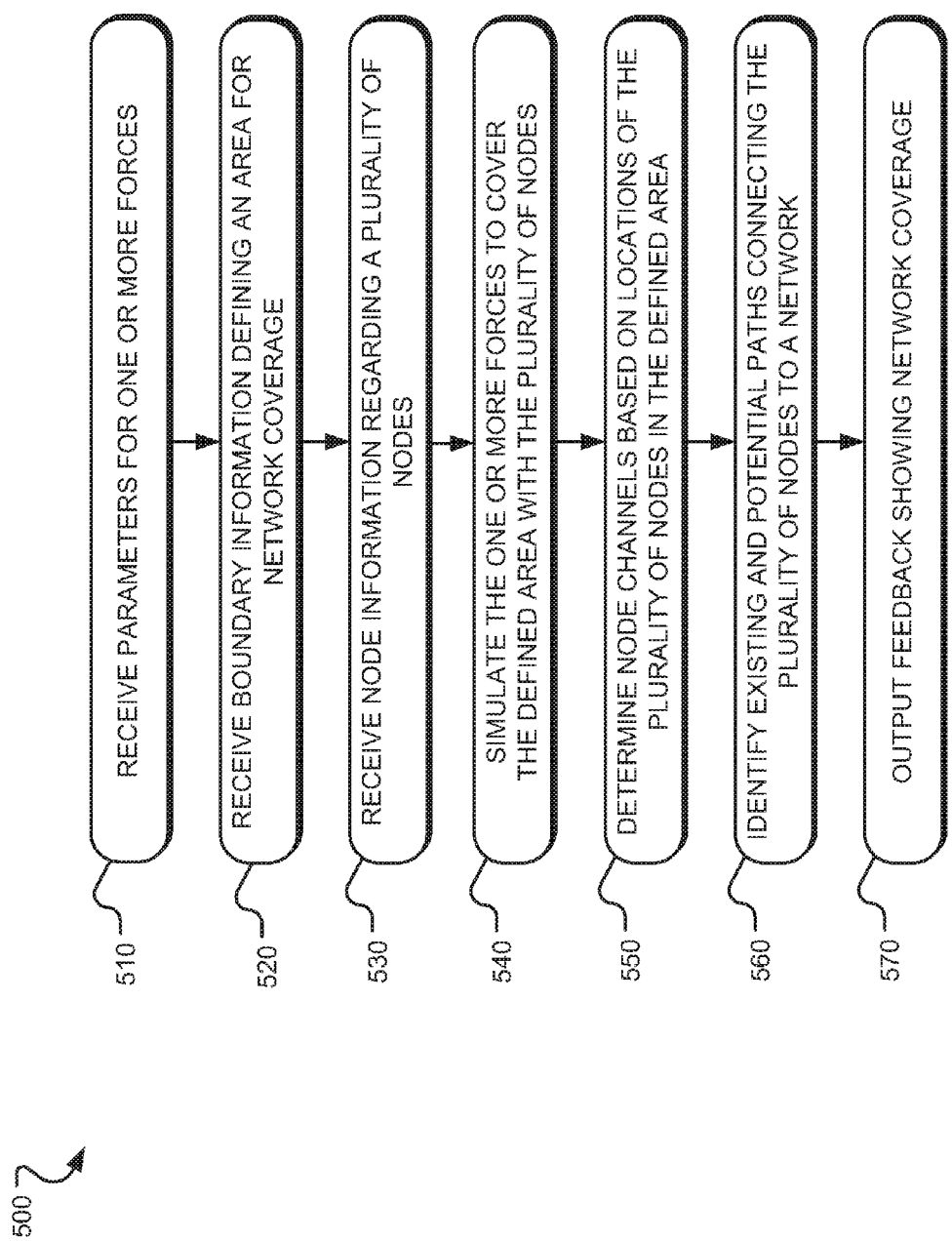

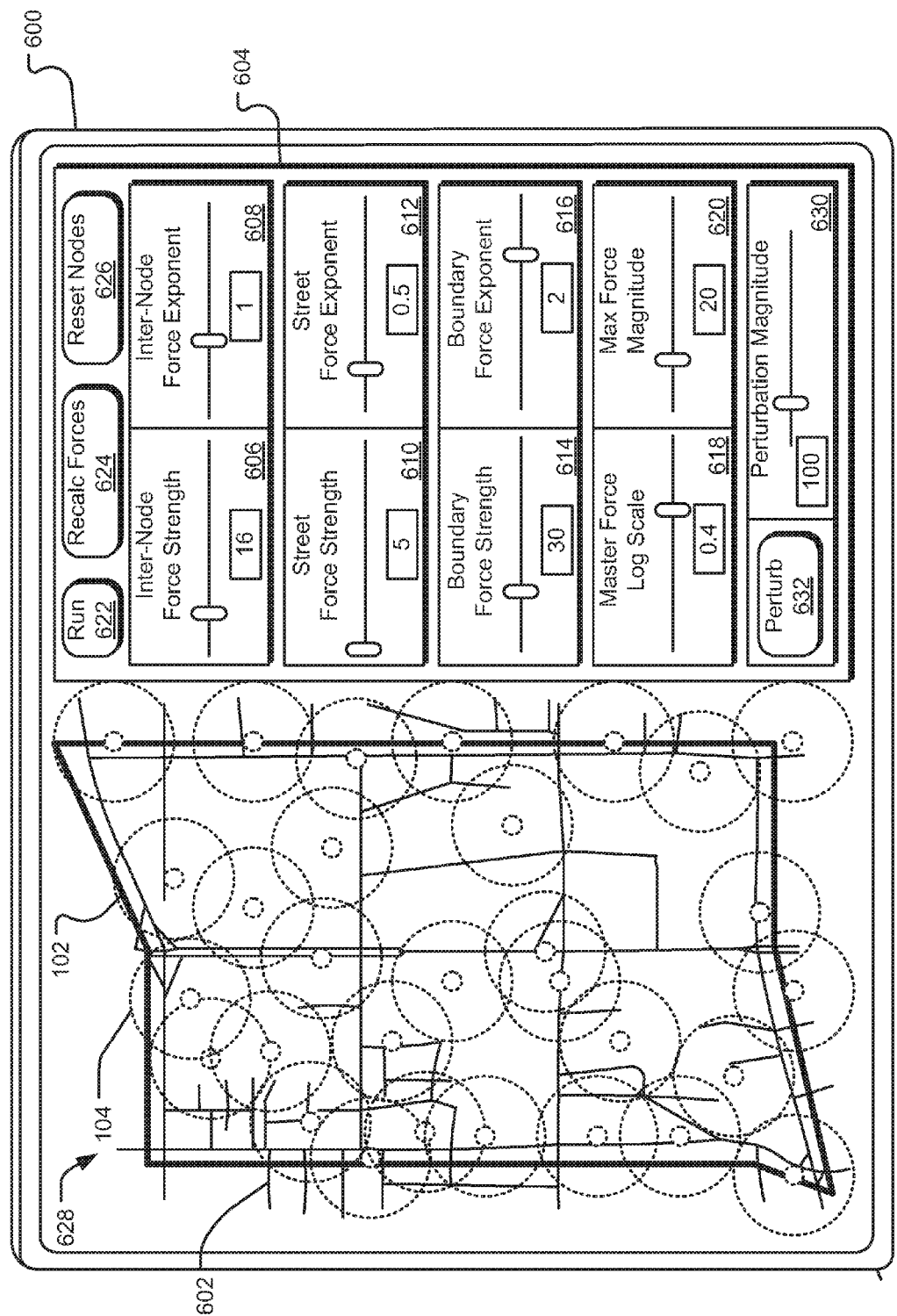

SYSTEM AND METHODS FOR OBTAINING UBIQUITOUS NETWORK COVERAGE

APPLICATION PRIORITY

This application is a continuation of and claims the benefit of priority to U.S. patent application Ser. No. 13/707,381, entitled "SYSTEM AND METHODS FOR OBTAINING UBIQUITOUS NETWORK COVERAGE," filed Dec. 6, 2012, the entire contents of which are fully incorporated herein for all purposes.

TECHNICAL FIELD

Aspects of the present disclosure relate to communication networks, and in particular, methods and systems relating to the design and optimization of network coverage, paths, and configurations.

BACKGROUND

Designing a network, including wireless, computer, cellular, or other communications networks, to substantially cover a particular geographical area, such as a metropolitan city, is complex and time consuming. Some providers utilize software to calculate network coverage once routers, cell sites, or other communication nodes are placed. However, before that can occur, the provider must determine how many nodes are needed to cover the particular geographical area and where the nodes should be placed, which is challenging, requires careful planning, and often involves trial and error. For example, while it is important to ensure that the geographical area is substantially covered, placing the nodes such that many of their ranges overlap can result in communications issues, such as a user device being unable to distinguish between the different signals from the nodes, or surplus nodes being included in the design. Each node is an additional cost to the provider. Accordingly, including surplus nodes in the network design may substantially increase the cost to the provider.

Further, careful consideration must be given to place the nodes relative to the provider's physical network. Building such a network or adding to it is a complicated and expensive endeavor. Construction of such a network typically involves trenching streets, physically laying cable in the trenches, and resurfacing the impacted streets, among other things. In some estimates, this expense is considerable and may be as much as hundreds of thousands of dollars per city block. Often, particularly with networks relying on fiber-optic cabling, building such a network requires carefully planning where it is possible to lay fiber and working closely with local governments and businesses that will be impacted when construction of the fiber network commences. The task is complicated as the network design must account for the locations where it is possible to build the network and must include physical connections to various customers. Moreover, connecting to such networks often requires customers to have to purchase or otherwise obtain hardware and/or software. Requiring each customer to have individual hardware to connect to the network is inconvenient for both the customer and the provider, as such hardware requires access by the provider to install and service the physical connections to the network.

It is with these observations in mind, among others, that various aspects of the present disclosure were conceived and developed.

SUMMARY

Implementations described and claimed herein address the foregoing problems by providing a system and methods for determining the minimum number of communication nodes to substantially cover a particular geographical area. In one implementation, at least one parameter for one or more forces configured to control interactions of a plurality of nodes is received. Each of the nodes has a node range corresponding to an effective operational limit of the node. Boundary information defining a geographical area to which coverage by a network may be provided is received. The one or more forces are simulated to distribute the plurality of nodes. The simulation of the one or more forces causes the plurality of nodes to become positioned in an overall layout such that the defined geographical area is substantially covered by the node ranges.

Implementations described and claimed herein further address the foregoing problems by providing a system and methods for optimizing an extension of an optical network to provide service to the communication nodes. Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

FIG. 4 is a flow chart showing example operations for designing a network that substantially covers a particular geographical area;

FIG. 5 is a flow chart illustrating example operations performed by a network optimizer for designing a network;

FIG. 10A shows the user interface of FIG. 6A after a perturbation force is applied;

DETAILED DESCRIPTION

Aspects of the present disclosure generally involve systems and methods for optimizing a network configuration, including determining locations for a minimum number of communication nodes needed to substantially cover a particular geographical area, such as a metropolitan city. Other aspects generally involve determining cost-effective network paths to connect the communication nodes to a network. Further, aspects of the present disclosure involve a network configuration optimally constructed in accordance with the systems and methods discussed herein.

The systems and methods described herein may be used, for example, in planning and constructing: a wireless network to provide internet service to a geographical area, such as a metropolitan city; a cellular network to provide service over a large geographical region; a security, surveillance, or other video network to monitor an area with a higher resolution; a sound system with effectively spaced speakers; or other network configurations in which individual components have an effective range. Thus, although the following discussion is focused on communications networks, the presently disclosed technology may be implemented with respect to other network configurations.

Figure 1:
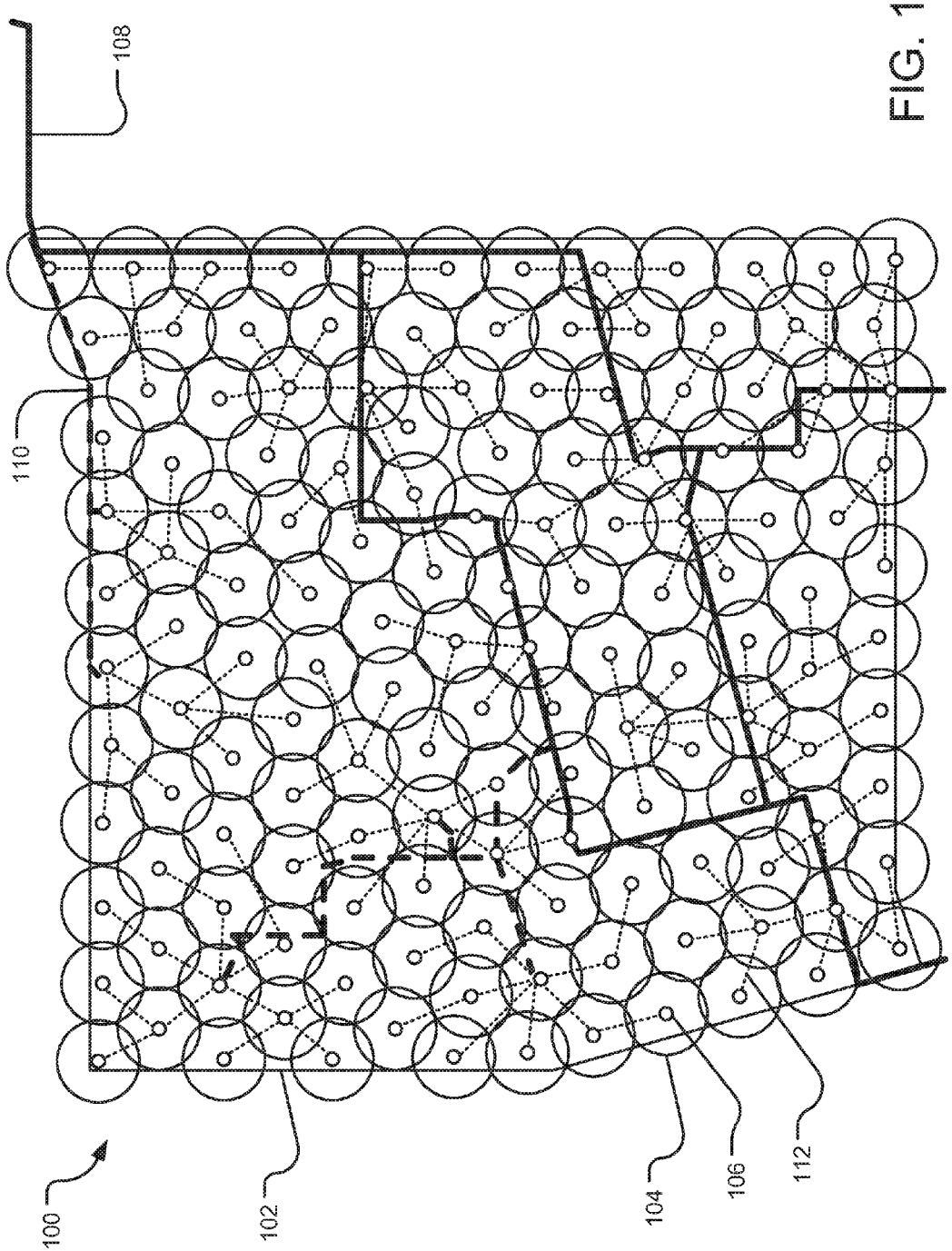
FIG. 1 shows an example network configuration providing coverage to a particular geographical area.

As can be understood from FIG. 1, which shows an example network configuration 100, the systems and methods described herein provide recommendations for optimal locations of a plurality of nodes and network paths to provide network coverage to a particular geographical area, as well as a fast, reliable approximation of various costs associated with those recommendations.

In one implementation, the network configuration 100 includes a boundary 102 defining a particular geographical area to which network coverage may be provided. Stated differently, the boundary 102 encloses the particular geographical area, such that areas located outside the boundary 102 generally will not receive service from a provider, while areas located within the boundary 102 will receive network coverage. As can be understood from the network configuration 100 shown in FIG. 1, the boundary 102 defines a particular geographical area, which is covered by a collection of node ranges 104 of a plurality of nodes 106. In one specific example, a node 106 may be represent a center of a wifi network node, and the circle 104 around the node 106 represents a range of the wifi node. The boundary 102 may be defined manually using, for example, a user interface or automatically based on geographical data corresponding to a geographical region in which the particular geographical area is located.

In some implementations, the boundary 102 includes a primary boundary which encloses the particular geographical area, such as a metropolitan city, and one or more secondary boundary segments, which exclude secondary geographical areas within the particular geographical area from coverage. In other words, it may be impractical, illogical, or undesirable to provide service to some areas within a geographical area to which service otherwise may be provided. For example, within a metropolitan city, there may be parks, military bases, or other buildings or institutions to which service cannot or should not be provided. Accordingly, the boundary 102 may include one or more secondary boundary segments excluding such secondary geographical areas from coverage. Further, the boundary 102 may include one or more tertiary boundary segments, which add coverage to tertiary geographical areas outside the particular geographical area. The particular geographical area enclosed by the primary boundary in addition to any areas enclosed by any tertiary boundary segments and excluding any secondary boundary segments represents the defined geographical area.

The systems and methods disclosed herein provide fast, reliable recommendations for optimal locations of the nodes 106 within the boundary 102, such as the collection of nodes 106 within the boundary 102 provides substantially complete coverage within the boundary 102. As such, in the case of a wifi network, a user of the wifi network would have a wifi signal of sufficient strength nearly anywhere within the boundary 102. In one implementation, the system is initialized or otherwise begins with locations of geographical features in a particular geographical area near which it is desirable to position network components. Stated differently, many network components should be installed in locations that are easily accessible by the provider for installation and maintenance. Such geographical features may include streets, telephone poles, light poles, street lamps, etc. For example, network paths, such as fiber-optic cabling, are often buried near streets. To provide service, network components should be connected to a network path. Accordingly, positioning network components near streets allows for easy installation and maintenance of the network components.

In one implementation, the nodes 106 are initially positioned within the boundary 102 (e.g., near a relative center of the particular geographical area) and spread out until the defined geographical area is substantially covered by the node ranges 104. Through a user interface, a user fills the boundary 102 with the nodes 106, and those nodes 106 automatically fill in the space. Moreover, the boundary 102, the nodes 106, and geographical features, such as streets, are configured to interact pursuant to force rules. Thus, the nodes 106 filling the space interact with other features of the defined geographical area as well as other nodes 106 within the defined geographical area In one implementation, the force rules include an inter-node force, a boundary-node force, and a feature-node force. The inter-node force operates to cause each of the nodes 106 to exert a repelling force on nearby nodes 106. The inter-node force spreads the nodes 106 relatively evenly until the node ranges 104 substantially cover the defined geographical area. The boundary-node force prevents the nodes 106 from spreading outside of the defined geographical area by causing the boundary 102 and the nodes 106 to repel each other. The feature-node force operates to attract the nodes 106 to geographical features, such as streets. The positions of the nodes 106 may be further adjusted based on: line of sight factors using 3D building and geographical feature data, potential and existing network paths; and other cost considerations (e.g., rent and availability) corresponding to a location within the defined area.

As a result, the nodes 106 are positioned such that the node ranges 104 provide substantially ubiquitous network coverage to the defined geographical area. As shown in FIG. 1, the nodes 106 are spread substantially evenly within the boundary 102; thereby maximizing the area covered by the node ranges 104 within the boundary 102 while minimizing the number of nodes 106. For example, the node ranges 104 cover the defined geographical area with minimal overlap of the node ranges 104.

Using the recommended number of the nodes 106 needed to cover the defined geographical area, a provider may obtain fast, reliable approximation of a cost associated with the nodes 106 included in the network configuration 100. Each of the nodes 106 represents an additional cost, which may be a substantial cost in many instances. For example, where the nodes 106 are wifi radios, each of the nodes 106 may be an additional $2,000.

To obtain a more detailed approximation of the various costs associated with constructing the network configuration 100, the systems and methods described herein determine cost-effective network paths to the nodes 106. In the example network configuration 100, existing fiber-optic cabling (or other networking conduits or channels) 108 is shown in bold line. The system determines whether and where to connect new fiber 110 (shown in bold dashed line) to the existing fiber 108. In making this determination, the system may take into account the location of the existing fiber 108, the locations of the nodes 106, and/or other network components. For example, as can be understood from the example network configuration 100, in one implementation, the location(s) of the new fiber 110 is determined, such that each node 106 is connected, in the most cost-efficient manner, to either the existing fiber 108, the new fiber 110, or via point-to-point connections 112 between two nodes 106, shown in dotted line.

Accordingly, the network configuration 100 provides a fast, reliable cost estimation for covering the defined geographical area as well as recommendations for constructing a network configuration for the defined geographical area. Using the network configuration 100, a provider may evaluate: whether to invest in covering the defined geographical area with the nodes 106; whether to invest in routing new fiber 110; where to position the nodes 106; where to connect the new fiber 110 to the existing fiber 108; and the optimal path of the new fiber 110 to connect the nodes 106 using the point-to-point connections 112 or directly.

From both a customer and a provider perspective, the network configuration 100 is convenient. Because the defined geographical area is substantially covered by the node ranges 104, a customer can merely subscribe to the provider's service to obtain coverage without having to purchase or obtain individual hardware. For example, a customer could obtain internet service merely by subscribing to an internet provider's service rather than having to purchase and maintain an individual router. Additionally, because the nodes 106 are positioned near geographical features, such as streets or telephone poles, which are easily accessible, a provider does not have to coordinate with a customer to install or provide maintenance to the nodes 106 and/or other network components. Further, the network configuration 100 allows the provider to serve the customers within the defined geographical area with a relatively higher bandwidth.

Figure 2A:
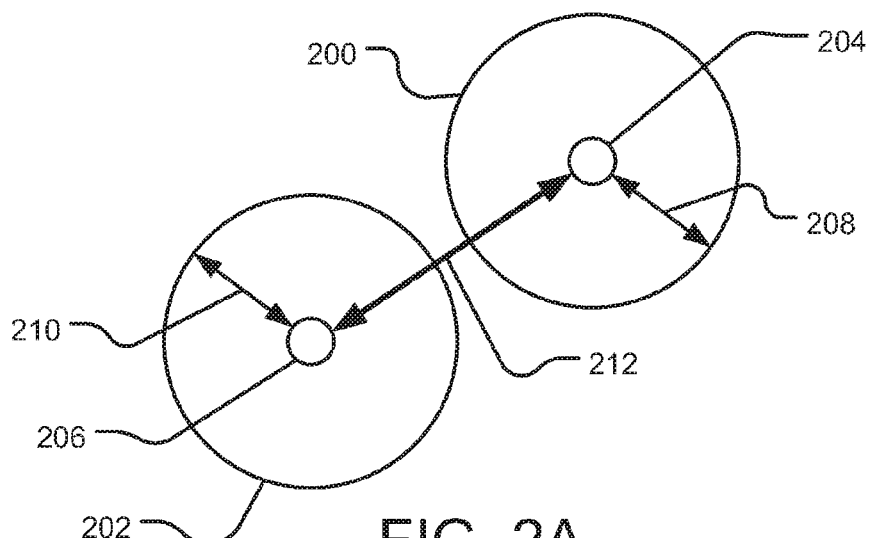
FIGS. 2A-2C illustrate example force rules used to determine placement of a plurality of nodes to cover a defined geographical area.
Figure 2B:
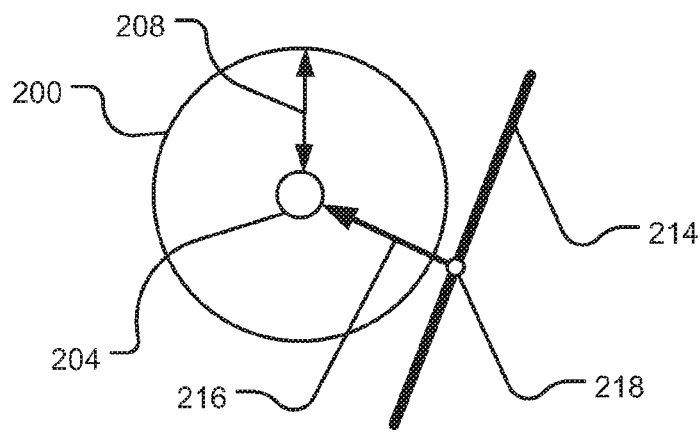
Figure 2C:
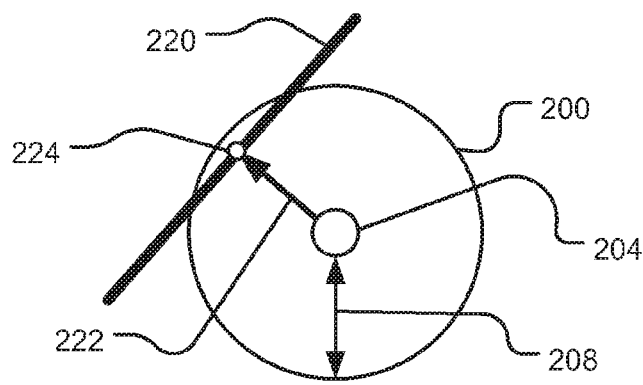

For a detailed discussion of example force rules used to determine placement of the nodes 106 to cover the defined geographical area, reference is made to FIGS. 2A to 2C, which illustrate the inter-node force, the boundary-node force, and the feature-node force, respectively.

As can be understood from FIG. 2A, a first node range 200 is positioned near a second range 202. The first and second node ranges 200 and 202 represent an effective range of a first node 204, and of a second node 206, respectively, as well as a range of one or more forces. The first node range 200 is defined by a first node radius 208, and the second node range 202 is defined by a second node radius 210. In one implementation, the radii 208 and 210 are fixed values, which may be determined based on operational characteristics of the nodes 204 and 206. The first radius 208 may be the same or different value as the second radius 210.

The first node 204 is positioned at a distance 212 from the second node 206. The inter-node force exerts a uniform force vector on the first node 204 in a direction opposite the second node 206. Stated differently, the inter-node force causes the first node 204 and the second node 206 to repel each other. This repellant force spreads the nodes 106 evenly over the defined geographical area and minimizes overlap of the node ranges 104.

A magnitude of the inter-node force dictates the degree to which the first node 204 and the second node 206 repel each other. In other words, the higher the magnitude of the inter-node force, the more the first and second nodes 204 and 206 repel each other, and the less the first and second node ranges 200 and 202 overlap. Conversely, the lower the magnitude of the inter-node force, the less the first and second nodes 204 and 206 repel each other, and the more the first and second node ranges 200 and 202 overlap. Furthermore, in one implementation, the magnitude of the inter-node force is proportional to a positive power of the difference between the first radius 208 and the distance 212, so the closer the first and second nodes 204 and 206 are to each other, the more the first and second nodes 204 and 206 repel each other.

Turning to FIG. 2B, the first node 204 is positioned near a boundary segment 214 at a distance 216 from a closest point 218 on the boundary segment 214. The boundary-node force exerts a uniform force vector on the first node 204 in a direction opposite the closest point 218 on the boundary segment 214. Specifically, the boundary-node force causes the boundary segment 214 to repel the first node 204. The boundary-node force prevents the nodes 106 from spreading outside the defined geographical area.

Similar to the inter-node force, a magnitude of the boundary-node force dictates the degree to which the boundary segment 214 repels the first node 204. As such, a higher boundary-node force magnitude results the first node range 200 overlapping the boundary segment 214 less, and a lower boundary-node force magnitude causes more overlap of the first node range 200 and the boundary segment 214. In one implementation, the boundary-node force magnitude is proportional to a positive power of the difference between the first radius 208 and the distance 216, which means that the closer the first node 204 is to the boundary segment 214, the more the boundary segment 214 repels the first node 204.

In the example feature-node force illustrated in FIG. 2C, the first node 204 is positioned near a street segment 220 at a distance 222 from a closest point 224 on the street segment 220. Although the discussion of FIG. 2C references the street segment 220, it will be appreciated by those skilled in the art that the feature-node force may be implemented with respect to other geographical features as well. The feature-node force exerts a uniform force vector on the first node 204 in a direction towards the closest point 224 on the street segment 220. Stated differently, the feature-node causes the street segment 220 to attract the first node 204. The feature-node force operates to position the nodes 106 near geographic features.

A magnitude of the feature-node force dictates the degree to which the first node 204 is attracted to the street segment 220. In other words, a higher magnitude of the feature-node force means the first node 204 is positioned closer to geographic features, such as the street segment 220. Furthermore, in one implementation, the magnitude of the feature-node force is proportional to a positive power of the difference between the first radius 208 and the distance 222, so the closer the first node 204 is to the street segment 220, the more the street segment 220 attracts the first node 204.

With respect to FIGS. 2A to 2C, in one implementation, where the distances 212, 216, or 222 are less than a force range, the magnitudes of the inter-node, boundary-node, and feature-nodes forces are each determined based on the equation:

$$|\vec{F}| = S\left(1 - \frac{d}{R}\right)^K,$$

wherein R is the range of the force, d is the distance 212, 216, or 222, S is a strength multiplier, and K is a force power. Where K=1, the force is linear.

A higher K value provides a lower force magnitude, and a lower K value provides a higher force magnitude. As such, a higher K value results in more overlap of the first node range 200 with the second node range 202 or with the boundary segment 214 and in less overlap with the street segment 220. Conversely, a lower K value results in less overlap of the first node range 200 with the second node range 202 or with the boundary segment 214 and in more overlap with the street segment 220. Where the distances 212, 216, or 222 are greater than or equal to the value of the force range, the magnitudes of the inter-node, boundary-node, and feature-nodes forces is zero.

In one implementation, inter-node force parameters are generally set to: R equal to twice the first radius 208; S equal to 30; and K equal to 1.0, boundary-node force parameters are generally set to: R equal to the first radius 208; S equal to 30; and K equal to 2.0, and feature-node force parameters are generally set to: R equal to the first radius 208; S equal to 4; and K equal to 0.5. In this implementation, the inter-node force is linear, the boundary-node force permits overlap of the first node range 200 with the boundary segment 214, and the first node 204 is relatively strongly attracted to the street segment 220. As such, in this implementation, it is a higher priority for the first node 204 to be positioned near the street segment 220 than to be positioned away from second node 206 or the boundary segment 214.

Using the inter-node, boundary-node, and feature-node forces, the systems and methods described herein provide fast, reliable recommendations for optimal locations of the nodes 106 within the boundary 102. Once the nodes 106 are positioned, the systems and methods described herein determine an extension of an existing network to provide cost-effective network paths to the nodes 106, which is detailed with respect to FIG. 3.

Figure 3:
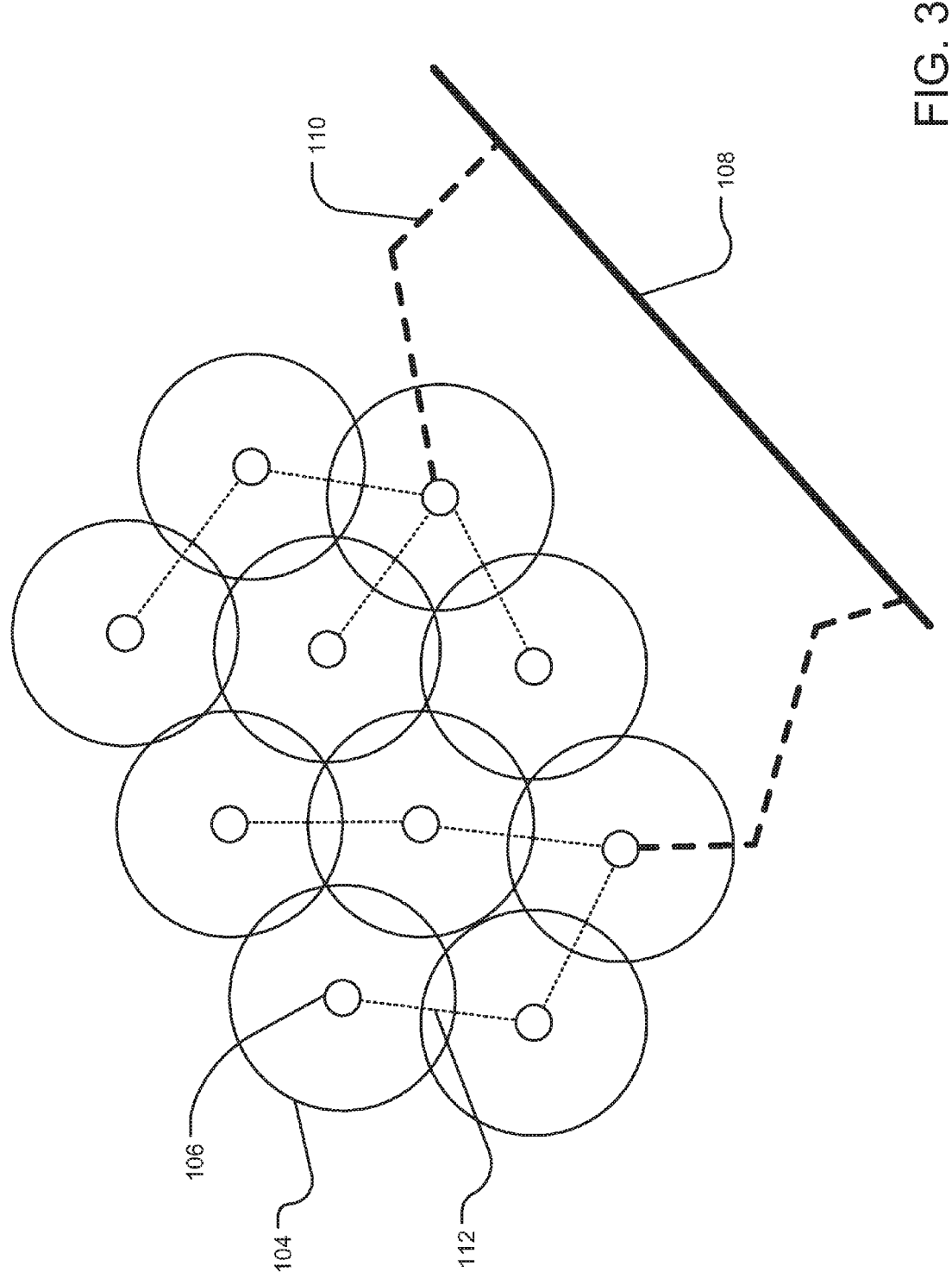
FIG. 3 shows an example of an extension of an existing optical network to provide service to a plurality of nodes.

FIG. 3 shows the existing fiber 108 connected to the new fiber 110, which then either directly or via the point-to-point connections 112 connects the nodes 106 to the network. As described herein, optic-fiber cabling is expensive, and as such, to be cost-effective, the amount of optic-fiber cabling, particularly the new fiber 110, used in a network configuration should be minimized. The point-to-point connections 112 communicate between two of the nodes 106 using concentrated beam signals operating over line of sight. The point-to-point connections 112 provide more connections of the nodes 106 to the network without increasing the amount of the new fiber 110; thereby reducing the cost while increasing the amount of the nodes 106 connected to the network. However, the more "hops" from one of the nodes 106 to another of the nodes 106 via the point-to-point connections 112 increases the probability that one of the nodes 106 will disconnect from the network. Accordingly, the amount of "hops" or positions any of the nodes 106 is removed from the new fiber 110 or the existing fiber 108 should be minimized. In one implementation, each of the nodes 106 is no more than two hops or connection points away from the existing fiber 108 or the new fiber 110 via the point-to-point connections 112.

In one implementation, a recommendation is provided for a network configuration that connects the nodes 106 in the most cost-efficient manner to the existing fiber either directly or via the new fiber 110 or the point-to-point connections 112. In making this recommendation, a computer implemented algorithm may be used to determine the most cost effective way to connect the nodes 106 to the network, while limiting hops in the point-to-point connections 112 and build out of the new fiber 110. For example, the recommendation may be determined based on a mixed linear-integer programming algorithm and related systems and methods used to identify potential network paths necessary to maximize a net value of a communications network similar to those disclosed in U.S. patent application Ser. No. 13/281,372 to Peterson, entitled "Network Optimization" and filed on Oct. 25, 2011, which is hereby incorporated by reference in its entirety into this Detailed Description. The network expansion optimization gives the optimal cost-effective set of new fiber 110 and point-to-point connections 112 to backhaul the network traffic from the nodes 106 to the existing fiber 108.

FIG. 4 is a flow chart showing example operations 400 for designing a network that substantially covers a particular geographical area. In one implementation, a defining operation 410 defines parameters for one or more forces configured to control movement of a plurality of communications nodes. Each of the communications nodes has an effective range within which it is operable to provide network service. The parameters may be variables affecting a magnitude of one of the forces, which configure interactions between: a first node and a second node; the first node and a boundary segment; and the first node a feature segment. In one implementation, the defining operation 410 sets the parameters manually via a user interface. For example, the user interface may display a sliding bar and/or buttons with which a user may set values for the parameters for the one or more forces. In another implementation, the defining operation 410 defines the parameters automatically based on geographical and other data corresponding to the particular geographical area.

A second defining operation 420 defines a boundary surrounding the particular geographical area. In one implementation, the defining operation 420 defines the boundary manually using a user interface and input device. For example, the user interface may display a map of a geographical area, such as a metropolitan city. The defining operation 420 creates a layer over the map showing the boundary on the user interface. In another implementation, the defining operation 420 defines the boundary automatically based on user input and geographical data corresponding to a geographical region in which the particular geographical area is located. For example, a user may select a define boundary option via the user interface, and in response, the defining operation 420 automatically generates the boundary. The boundary may include primary, secondary, and tertiary boundary segments, as described herein. The boundary encloses the defined geographical area.

A placing operation 430 places a plurality of nodes within the boundary. The number of nodes placed is determined based on the size and shape of the defined geographical area. In one implementation, a user estimates a number of nodes needed to substantially cover the defined geographical area, and the placing operation 430 places those nodes within the boundary. In another implementation, the placing operation 430 automatically determines the approximate number of nodes needed to cover the defined geographical area, for example, based on the size and shape of the defined geographical area as compared to a defined node range of the plurality of nodes. In one implementation, the placing operation 430 places the nodes near the relative center of the defined geographical area. The nodes may be placed manually using a user interface and input device or automatically.

After the placing operation 430 places the nodes within the boundary, the nodes interact within the defined geographical area based on the one or more forces, causing the nodes spread until the nodes are substantially evenly distributed such that the defined geographical area is substantially covered by the node ranges. Once the nodes have settled into locations, an adjusting operation 440 adjusts the locations of one or more nodes and/or the number of nodes to: minimize overlap of the node ranges, provide coverage to an area not covered by one of the node ranges, minimize the number of nodes, or change the network configuration or overall node layout. For example, where there is a gap in the coverage provided by the node ranges, the adjusting operation 440 may add an additional node to that gap. Adding the additional node causes the neighboring nodes to adjust locally to accommodate the additional node while retaining the overall node layout. As another example, if the overall node layout has many gaps or is otherwise undesirable, the adjusting operation 440 may perturb the plurality of nodes, causing the nodes to move in random directions and settle in an altered node layout. A receiving operation 450 receives feedback showing the network coverage for the defined geographical area. In one implementation, the receiving operation 450 receives the feedback on a graphical user interface. In one implementation, the receiving operation 450 receives continuous, substantially real time feedback during each of the operations 410-440.

FIG. 5 is a flow chart illustrating example operations 500 performed by a network optimizer for designing a network. In one implementation, a receiving operation 510 receives parameters for one or more forces configured to control movement of a plurality of communications nodes. Each of the communications nodes has an effective range within which it is operable to provide network service. The parameters may be variables affecting a magnitude of one of the forces, which configure interactions between: a first node and a second node; the first node and a boundary segment; and the first node a feature segment. In one implementation, the forces include an inter-node force, a boundary-node force, and a feature-node force. However, other forces relating to interaction of the nodes within a defined geographical area are contemplated.

A second receiving operation 520 receives boundary information defining a particular geographical area to which network coverage may be provided. In one implementation, the boundary information received during the second receiving operation 520 includes primary, secondary, and tertiary boundary segment information. The primary boundary segment information corresponds to the particular geographical area. The secondary boundary segment information defines secondary geographical areas within the particular geographical area which are excluded from coverage, and the tertiary boundary segment information defines tertiary geographical areas to which coverage is provided outside the particular geographical area. The particular geographical area enclosed by the primary boundary in addition to any areas enclosed by any tertiary boundary segments and excluding any secondary boundary segments represents the defined geographical area.

A third receiving operation 530 receives node information regarding the plurality of nodes. In one implementation, the node information includes an effective limit of a node range for each of the nodes. For example, the third receiving operation 530 may receive a radius of the node range for each of the nodes. The radius for the plurality of nodes may be a fixed value for all of the nodes or each of the nodes may have a different radius.

A simulating operation 540 simulates the one or more forces to spread the nodes until the defined geographical area is substantially covered by the node ranges. In one implementation, the simulating operation 540 simulates the forces as described with respect to FIGS. 2A-2C. As a result of the simulating operation 540, the nodes are distributed substantially evenly over the defined geographical area with overlap of the node ranges minimized, thereby decreasing communication issues associated with overlapping signals.

To further decrease or substantially eliminate such communication issues, in one implementation, once an overall node layout is obtained, a determining operation 550 assigns each of the nodes a frequency channel based on an overall layout of the nodes. In other words, the determining operation 550 determines a channel for each of the nodes such that neighboring nodes have a different channel and overlapping of nodes with the same channel is avoided. In one implementation, the determining operation 550 utilizes an algorithm such as a greedy algorithm, which determines the channel for each of the nodes by making a locally optimal choice at stage of the analysis. In some implementations, twelve channels are available, and the lowest available channel number is selected for each node. The assigned channels may be displayed visually via a user interface. For example, each channel may be represented by a different color, so once a node is assigned a channel, the node is displayed on the user interface in the color corresponding to the assigned channel. The colored overall node layout may then be examined to confirm that there are no instances of nodes having the same color with their ranges overlapping.

An identifying operation 560 identifies existing and potential network paths to connect the nodes to a network to provide service. In one implementation, the identifying operation 560 identifies a most cost-efficient manner to connect the nodes to existing fiber either directly or via new fiber and/or point-to-point connections. The identifying operation 560 may identify the existing and potential network paths, for example, as described with respect to FIG. 3.

An outputting operation 570 outputs feedback showing the network coverage provided by the recommended network configuration determined according to operations 510-560. In one implementation, the outputting operation 570 displays the feedback on a graphical user interface in the form of visual graphical, for example, as shown in FIGS. 6A-10B. In another implementation, the outputting operation 570 outputs the feedback in a table.

FIGS. 6A-10B illustrate an example user interface 600 for defining parameters for configuration the nodes to design and optimize network coverage for a defined geographical area. The user interface 600 further displays visual feedback of a recommended network configuration. The examples shown in FIGS. 6A-10B are for illustrative purposes only to show how altering various parameters of the nodes, forces, and/or other components impacts the recommended network configuration. These examples should not be considered limiting.

The user interface 600 displays a particular geographical area having a plurality of streets 602. The boundary 102 encloses at least a portion of the particular geographical area creating a defined geographical area to which coverage is to be provided. In the examples shown in FIGS. 6A-10B, the boundary 102 is shown in bolded line and the nodes 106 and the node ranges 104 are shown as circles in dotted line.

The user interface 600 further displays one or more controls 604 for defining the parameters of the forces. The controls 604 include an inter-node force strength control 606 and an inter-node force exponent control 608. In one implementation, the inter-node force strength control 606 controls the value of S for the inter-node force magnitude, and the inter-node force exponent control 608 controls the value of K for the inter-node force magnitude, as described with respect to FIG. 2A. The controls 604 further include a street force strength control 610 and a street force exponent control 612. In one implementation, the street force strength control 610 controls the value of S for the feature-node force magnitude, and the street force exponent control 612 controls the value of K for the feature-node force magnitude, as described with respect to FIG. 2C. Additionally, the controls 604 include a boundary force strength control 614 and a boundary force exponent control 616. In one implementation, the boundary force strength control 614 controls the value of S for the boundary-node force magnitude, and the street force exponent control 616 controls the value of K for the boundary-node force magnitude, as described with respect to FIG. 2B.

In one implementation, the controls 604 further include master controls, including a master force log scale 618 and a maximum force magnitude 620, which define the overall parameters and limits for each of the forces. The controls 604 include one or more buttons, such as a run button 622, a recalculate forces button 624, and a reset nodes button 626. When selected, the run button 622 runs the simulation of the forces on the nodes 106, the recalculate forces button 624 recalculates the forces based on information input into the controls 604, and the reset nodes button 626 resets the nodes 106 to an original position, for example, near the approximate center of the defined geographical area. Feedback 628 of the network configuration determined based on the controls 604 is displayed on the user interface 600 continuously and in substantially real time. Finally, the controls 604 includes a perturbation magnitude control 630 and a perturbation button 632, which when selected perturbs the nodes 106 to adjust the overall node layout.

Figure 6A:
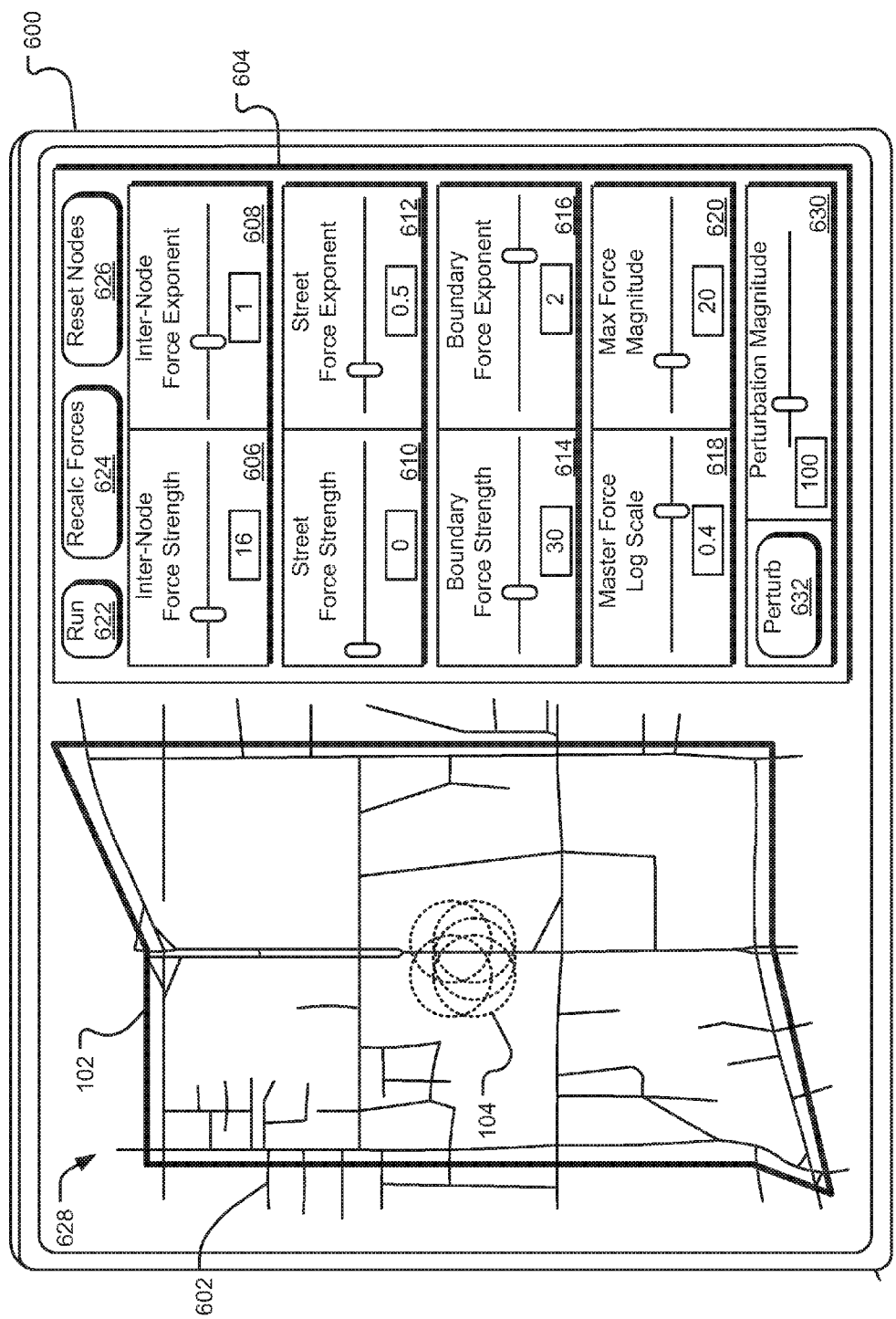
FIG. 6A shows an example user interface for defining parameters for configuration of a plurality of nodes to optimize network coverage for a defined geographical area.
Figure 6B:
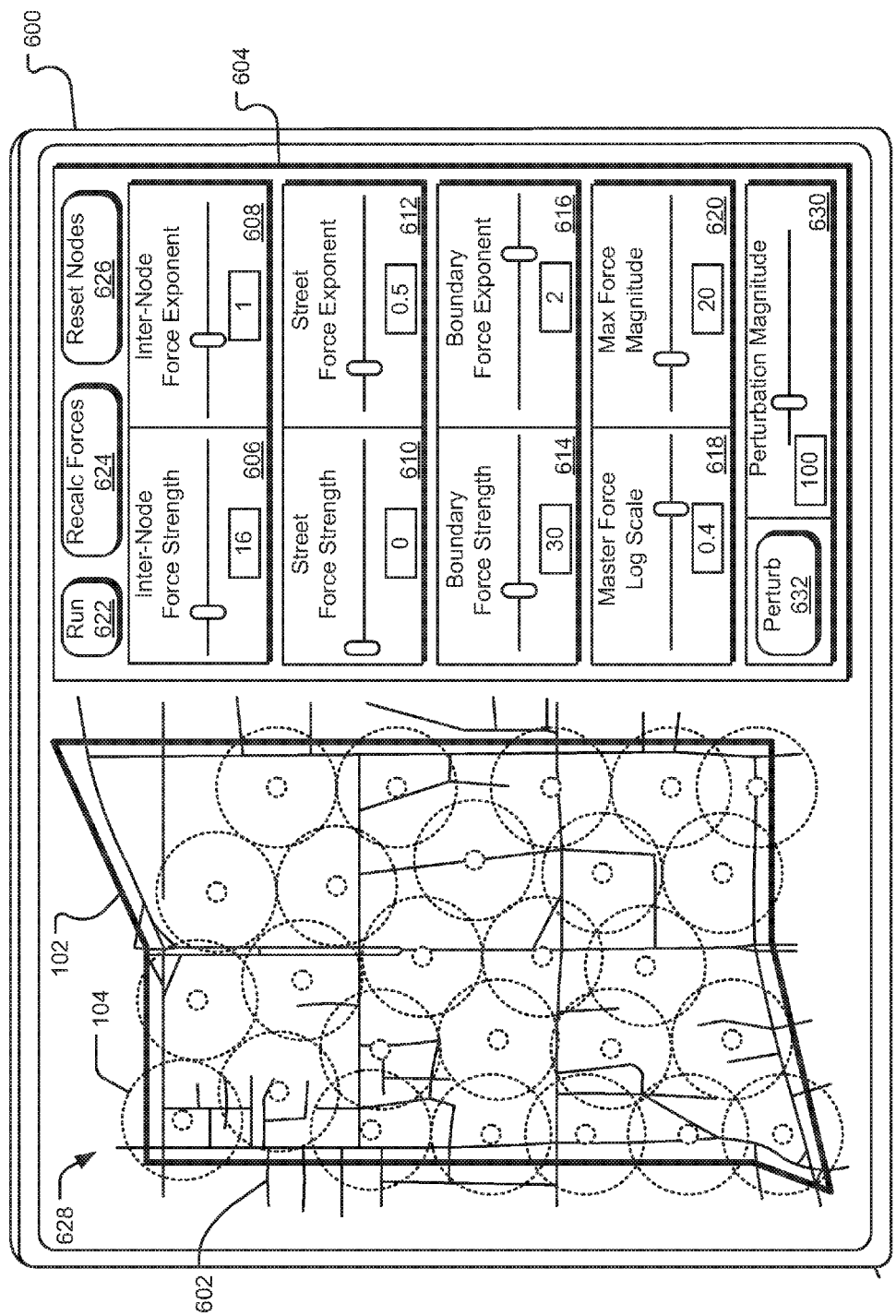
FIG. 6B depicts the user interface of FIG. 6A with the nodes spread over the defined geographical area.

Turning first to FIG. 6A, which is an initial state of the simulation, the node ranges 104 are shown placed in the approximate center of the defined geographical area. Based on the parameters of the forces defined using the controls 604, the nodes 106 spread until the node ranges 104 are distributed relatively evenly over the defined geographical area within the boundary 102, as shown in FIG. 6B. As they spread, the nodes 106 explore the defined geographical area with random perturbations. As the nodes 106 continue to spread, the positions of the nodes 106 become more rigid, and it becomes harder for the nodes 106 to move, which causes the nodes 106 to settle into an initial node layout. In one implementation, the nodes 106 spread according to a constant value, which can be sped up or slowed down. The rate at which the nodes 106 initially spread may impact the outcome of the initial node layout based on the interactions between the nodes 106 and the random perturbations.

Figure 6C:
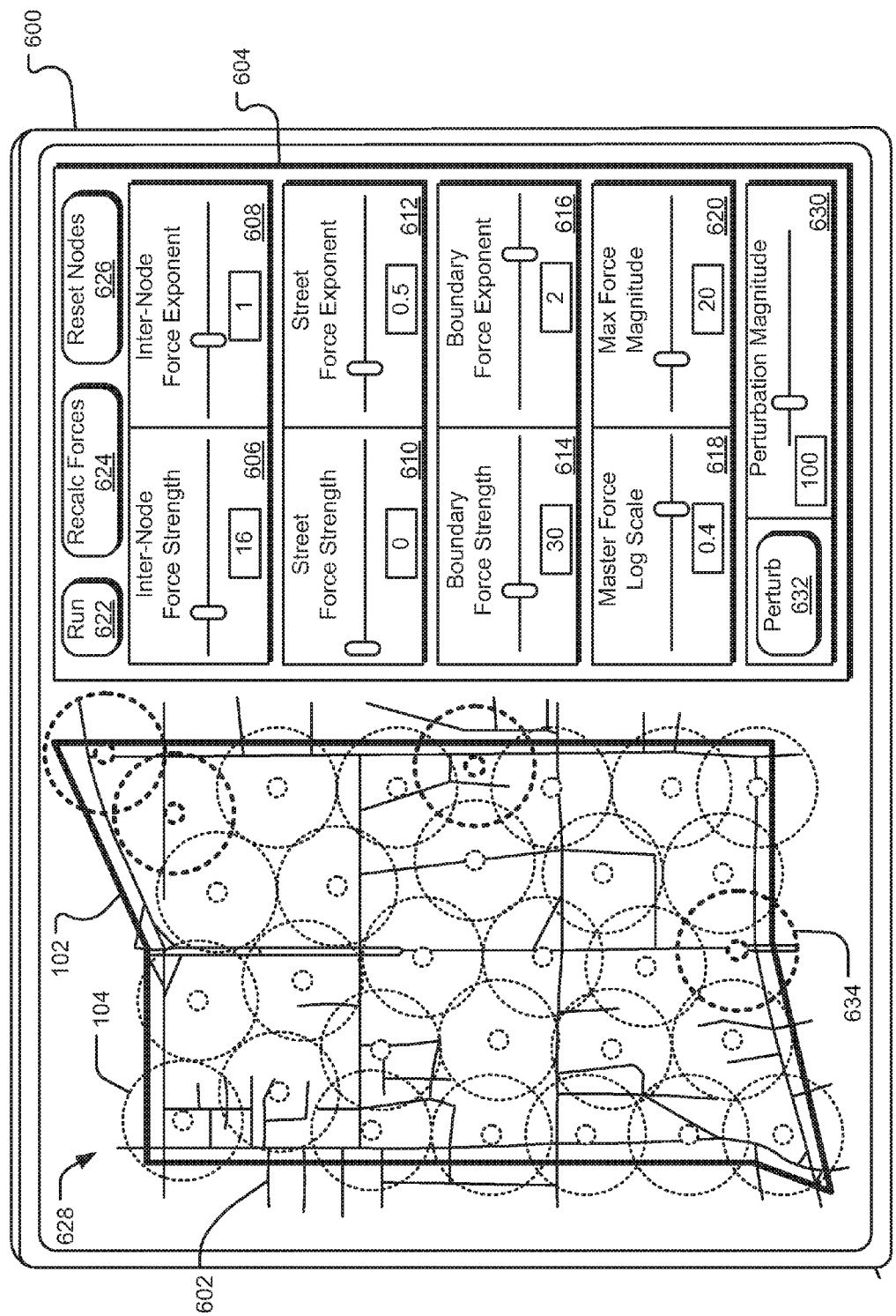
FIG. 6C illustrates the user interface of FIG. 6A with additional nodes added to fill gaps in the coverage.

As shown in FIG. 6B, once the nodes 106 have settled into approximate positions, any gaps in the coverage may be identified. To fill in the gaps, additional nodes 634 are added, as shown in FIG. 6C in bolded dotted line. In one implementation, the additional nodes 634 may be added using a user input device. For example, a user may click on the gaps using a mouse to add the additional nodes 634. In another implementation, the additional nodes 634 are automatically added based on an analysis of the coverage of the node ranges 104. Adding the additional nodes 634 adjusts the nodes 106 locally to accommodate the newly added additional node 634 while retaining the overall node layout.

Figure 6D:
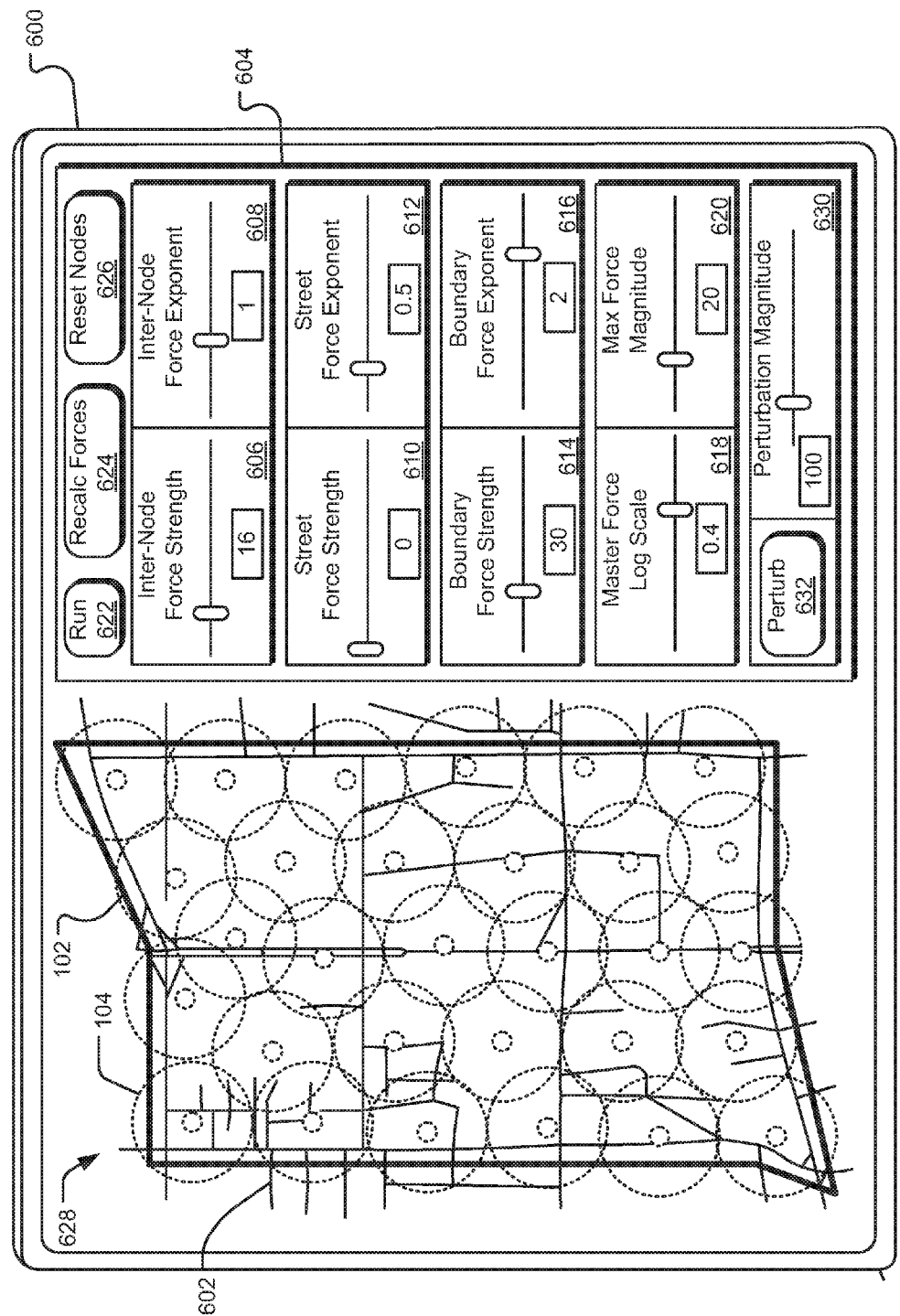
FIG. 6D illustrates the user interface of FIG. 6A after simulating the forces.

As can be understood from FIG. 6D, selecting the run button 622 causes the nodes 106 to distribute and position themselves according to the forces, the parameters of which being defined by the controls 604. In one implementation, the visual feedback 628 may further include a plurality of arrows (not shown for clarity), each arrow corresponding to one of the nodes 106. The arrows may show the direction and magnitude of a net force on each of the nodes 106. In other words, the arrow points in the direction the node 106 is being forced, and the length of the arrow represents the magnitude of that force. For example, a longer arrow may represent a larger force magnitude.

Figure 7A:
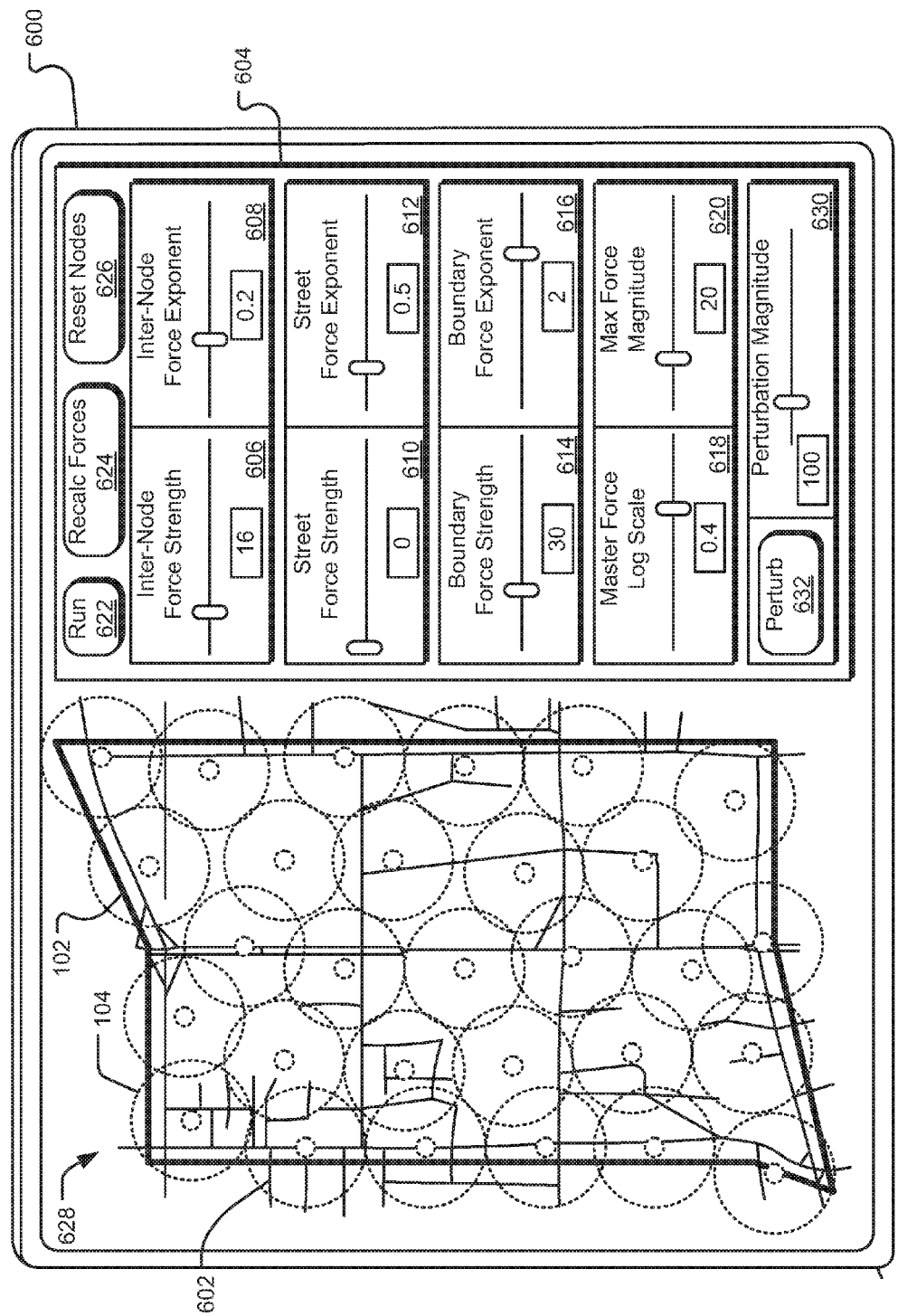
FIG. 7A shows the user interface of FIG. 6A with a relatively low inter-node force exponent.
Figure 7B:
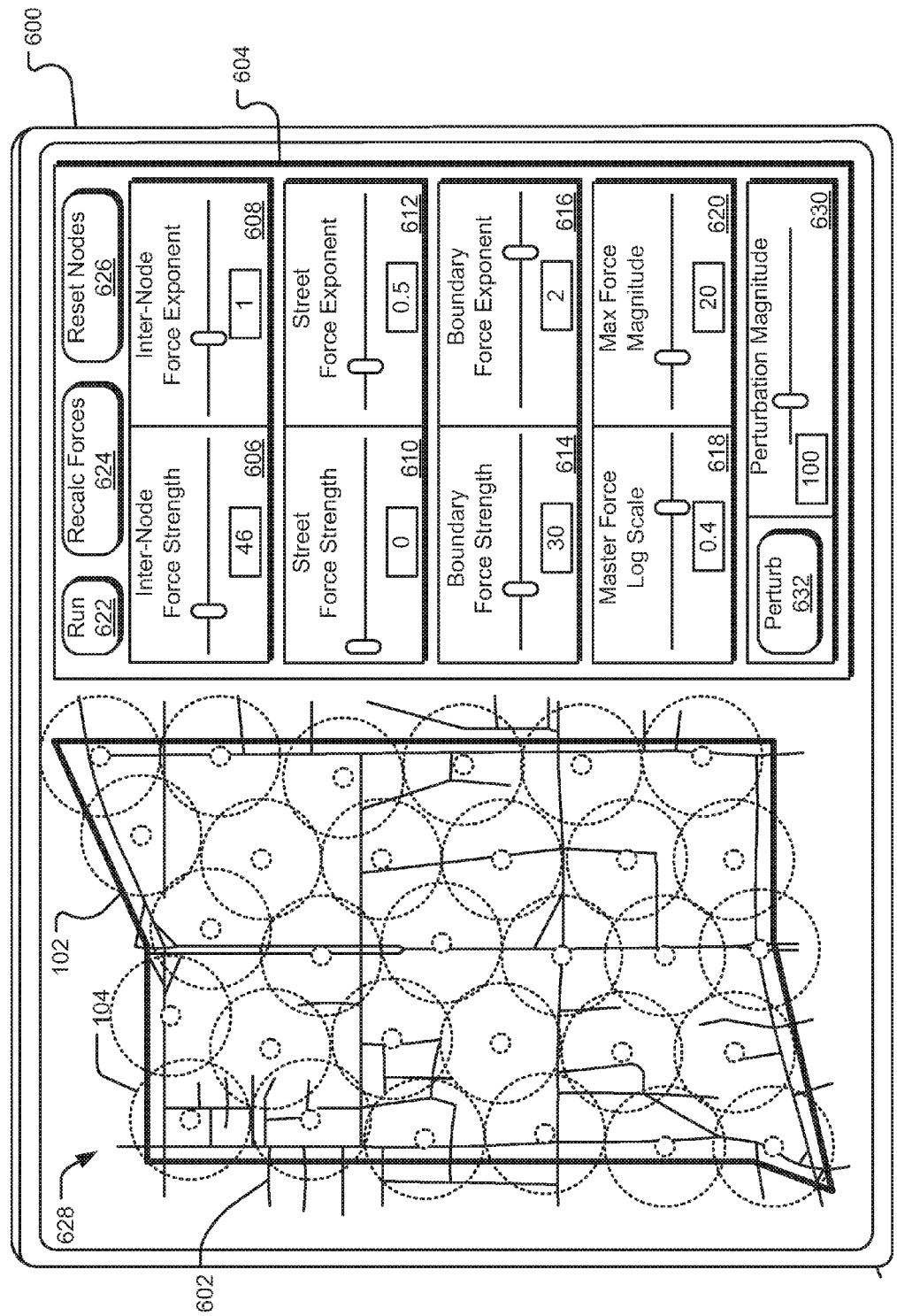
FIG. 7B depicts the user interface of FIG. 6A with a relative high inter-node force strength.

FIG. 7A illustrates the effect on the visual feedback 628 when the inter-node force exponent control 608 is set at a relatively low value. As described with respect to FIGS. 2A-2C, a lower K value results in a higher magnitude inter-node force and less overlap of the node ranges 104. Turning to FIG. 7B, the visual feedback 628 shows the affect of the inter-node force strength control 606 being set at a relatively high value. Again, as described with respect to FIGS. 2A-2C, a higher S value results in a higher magnitude inter-node force and less overlap of the node ranges 104.

Figure 8:
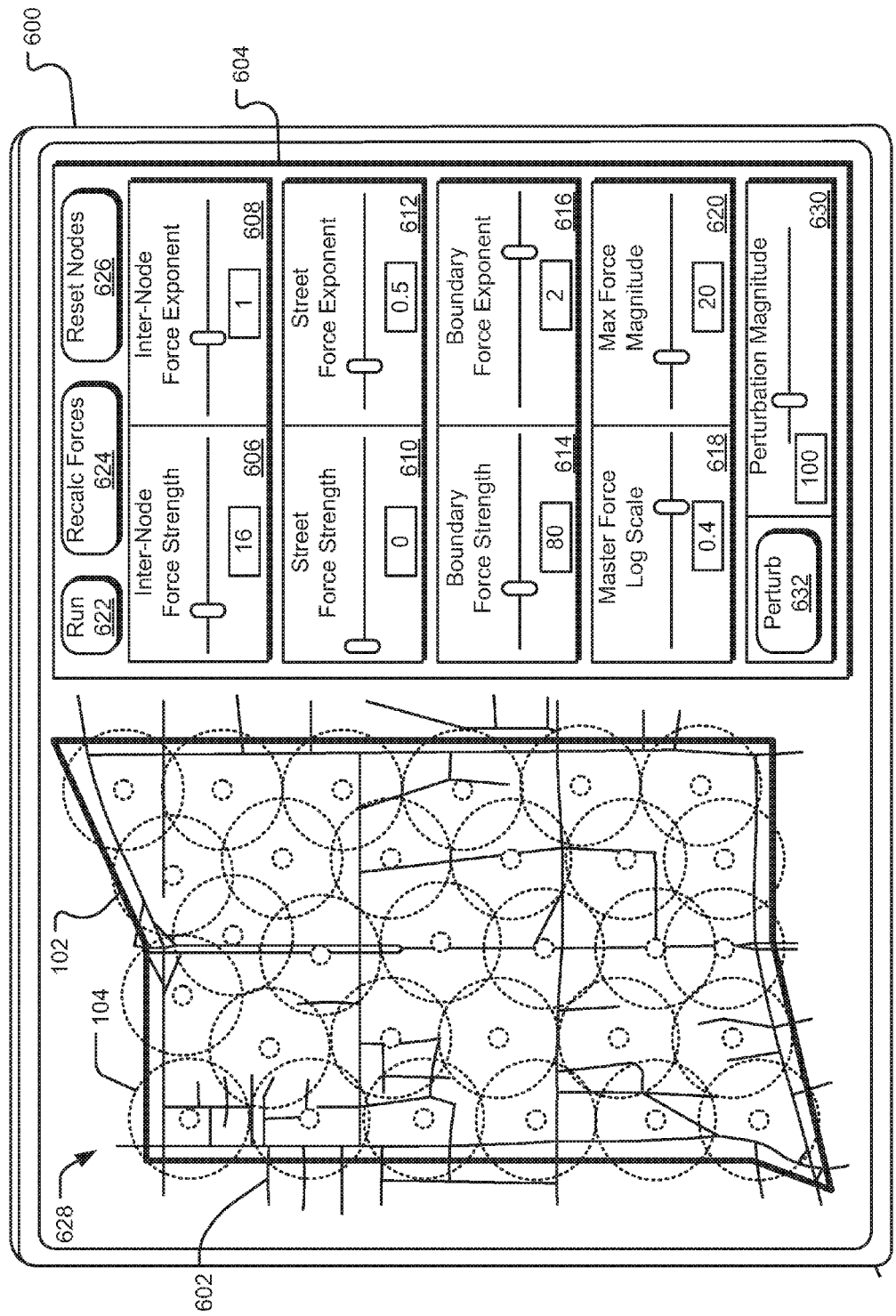
FIG. 8 illustrates the user interface of FIG. 6A with a relatively high boundary force strength.

FIG. 8 illustrates the effect on the visual feedback 628 when the boundary force strength control 614 is set at a relatively high value. As described with respect to FIGS. 2A-2C, a higher S value results in a higher magnitude boundary-node force and less overlap of the node ranges 104 with the boundary 102. However, because the boundary force exponent control 616 is set with a relatively high value, there is still some overlap of the node ranges 104 with the boundary 102.

Figure 9:
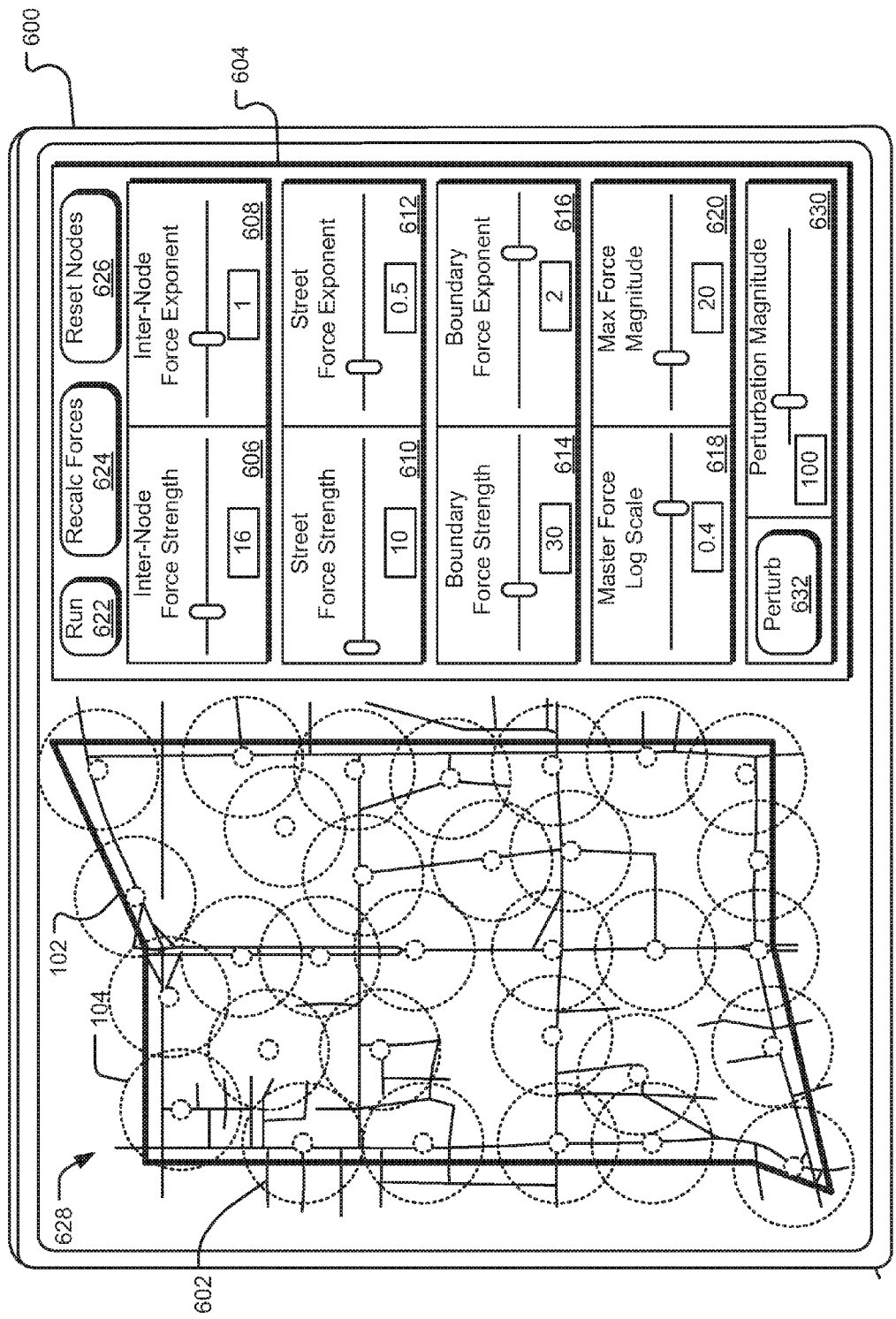
FIG. 9 shows the user interface of FIG. 6A with a relatively high street force strength.

FIG. 9 shows the effect on the visual feedback 628 when the street force strength control 610 is set above zero and the street force exponent control 612 is set at a relatively low value. As described with respect to FIGS. 2A-2C, a lower K value (the street force exponent control 612) and a higher S value (the street force strength control 610) results in a higher magnitude feature-node force. In the example shown in FIG. 9, the feature-node force is set at a higher magnitude than the inter-node force or the boundary-node force. Accordingly, it is a higher priority for the nodes 106 to position themselves closer to the streets 602 than to position themselves away from the boundary 102 or other nodes 106. As shown in FIG. 9, the nodes 106 are positioned on or near the streets 602.

Figure 10B:
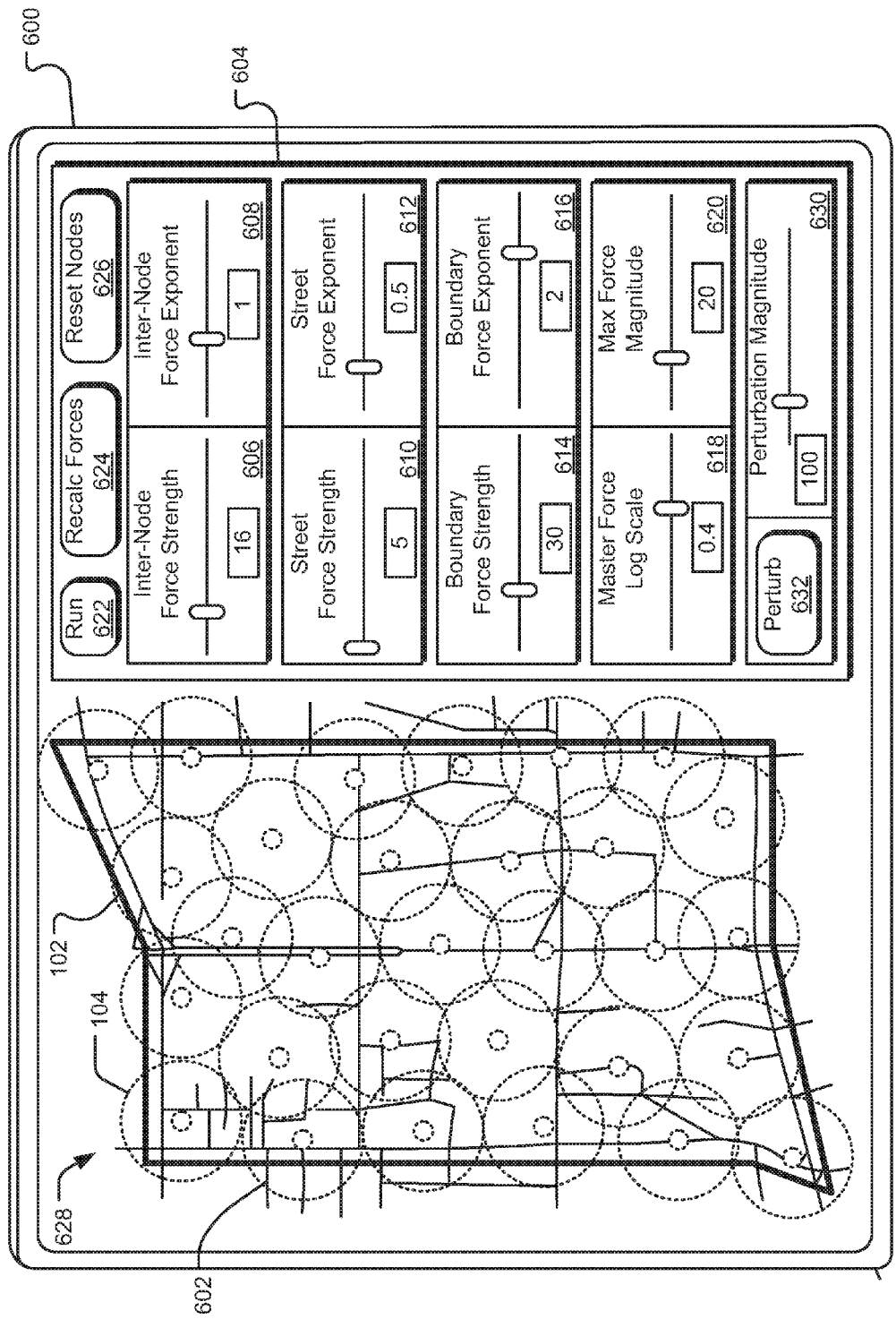
FIG. 10B illustrates the user interface of FIG. 10A after the nodes settled.

FIGS. 10A and 10B show the effect of the perturbation button 632 on the overall node layout shown in the visual feedback 628. When the perturbation button 632 is selected, the nodes 106 are forced in random directions with a relatively strong magnitude. As can be understood from FIG. 10A, the nodes 106 are randomly thrown in and around the defined geographical area. In one implementation, the perturbation button 632 simulates a "shaking" motion of the overall node layout. Accordingly, unlike filling gaps with the additional nodes 634, which locally alter the layout of the nodes 106, the perturbation button 632 may be used to alter the overall node layout. As shown in FIG. 10B, after the perturbation, the nodes 106 resettle over the defined geographical area based on the parameters of the forces.

Figure 11:
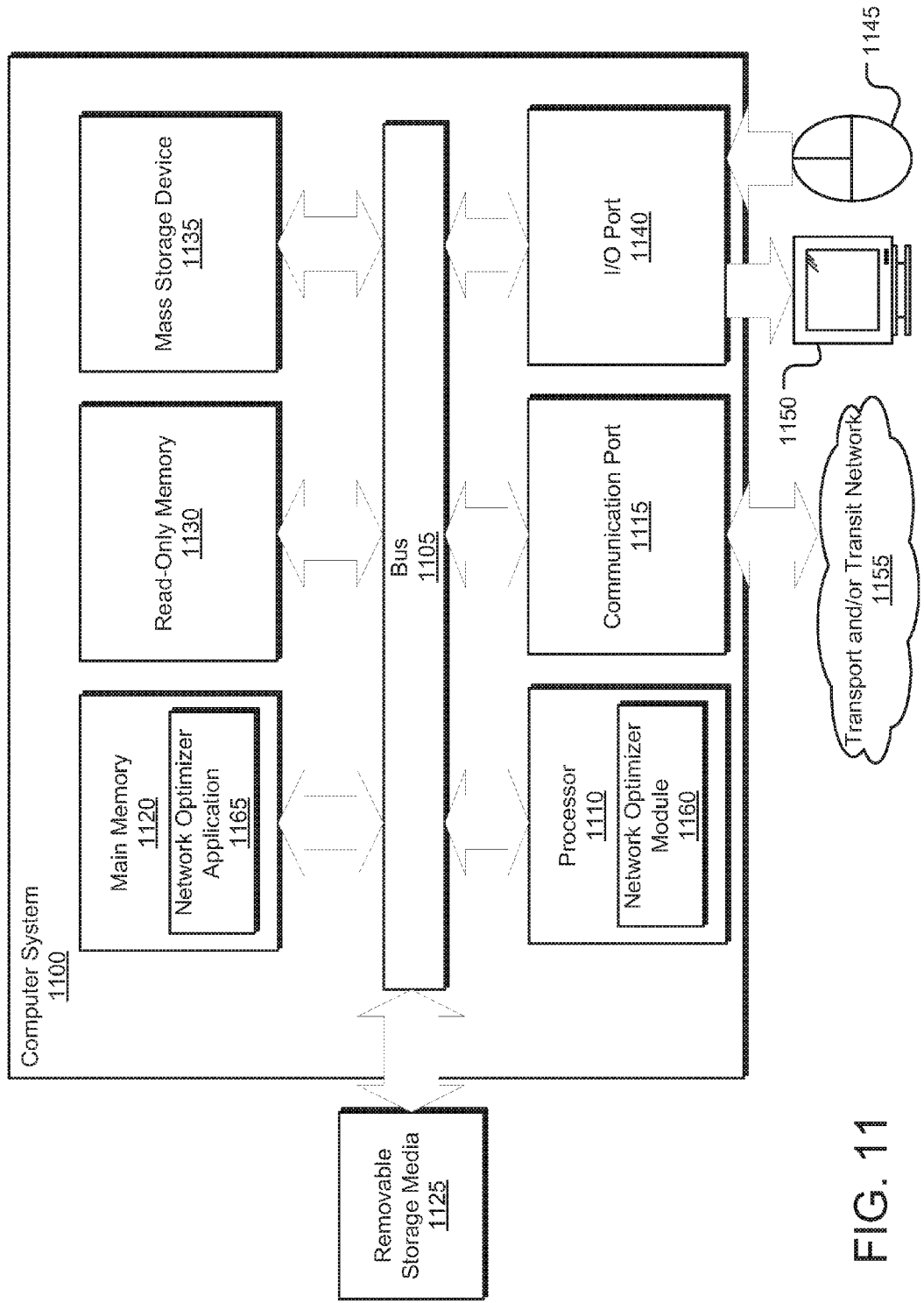
FIG. 11 is an example computing system that may implement various systems and methods discussed herein.

FIG. 11 is an example computing system 1100 that may implement various systems and methods discussed herein. The computer system 1100 includes one or more processors 1110. The processor 1110 may include one or more internal levels of cache (not shown) and a bus controller or bus interface unit to direct interaction with the processor bus 1105. The processor 1110 may include a network optimizer module 1160 that specifically implements the various methods discussed herein. The main memory 1120 may include one or more memory cards and a control circuit (not shown), or other forms of removable memory, and may store a network optimizer application 1165 including computer executable instructions, that when run on the processor, implement the methods and system set out herein. Other forms of memory, such as a mass storage device 1135, a read only memory 1130, and a removable storage memory 1125, may also be included and accessible, by the processor (or processors) 1110 via the bus 1105.

The computer system 1100 may further include a communication port 1115 connected to a transport and/or transit network 1155 by way of which the computer system 1100 may receive network data useful in executing the methods and system set out herein as well as transmitting information and network configuration changes determined thereby. The computer system 1100 may include an I/O device 1140, or other device, by which information is displayed, such as at display screen 1150, or information is input, such as input device 1145. The input device 1145 may be alphanumeric input device, including alphanumeric and other keys for communicating information and/or command selections to the processor. The input device 1145 may be another type of user input device including cursor control, such as a mouse, a trackball, or cursor direction keys for communicating direction information and command selections to the processors 1110 and for controlling cursor movement on the display device 1150. In the case of a tablet device, the input may be through a touch screen, voice commands, and/or Bluetooth connected keyboard, among other input mechanisms. The system set forth in FIG. 11 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
defining, using a computer, at least one parameter for one or more forces configured to control interactions of a plurality of nodes, each of the nodes having a node range corresponding to an effective operational limit of the node;
defining, using a computer, a boundary of a geographical area to which coverage by a network may be provided;
placing the plurality of nodes within the defined geographical area, the plurality of nodes interacting within the defined geographical area based on the one or more forces; and
receiving feedback showing an overall layout of the plurality of nodes on a graphical user interface in communication with the computer, the overall layout substantially covering the defined geographical area with the node ranges,
wherein the one or more forces includes a boundary-node force configured to exert a force vector on at least one of the plurality of nodes in a direction opposite a closest point on the boundary.

2. The method of claim 1, wherein the plurality of nodes includes a first node and a second node, the one or more forces including an inter-node force configured to exert a force vector on the first node in a direction opposite the second node.

3. The method of claim 1, wherein the one or more forces includes a feature-node force configured to exert a force vector on at least one of the plurality of nodes in a direction towards a closest point on a geographical feature positioned within the defined geographical area.

4. The method of claim 3, wherein the geographical feature is a street.

5. The method of claim 1, further comprising:
adjusting the overall layout of the plurality of the nodes.

6. The method of claim 5, wherein the adjusting operation comprises adding an additional node to cover a gap in the overall layout of the plurality of the nodes.

7. The method of claim 5, wherein the adjusting operation comprises perturbing the overall layout of the nodes.

8. The method of claim 5, wherein the adjusting operation is performed using a graphical user interface.

9. The method of claim 1, wherein the parameter defining and node placing operations are performed on a graphical user interface.

10. One or more non-transitory computer-readable storage media storing computer-executable instructions for performing a computer process on a computing system, the computer process comprising:
receiving at least one parameter for one or more forces configured to control interactions of a plurality of nodes, each of the nodes having a node range corresponding to an effective operational limit of the node;

receiving boundary information defining a geographical area to which coverage by a network may be provided;

identifying existing network paths and potential network paths to connect the plurality of nodes to the network;

simulating the one or more forces to distribute the plurality of nodes, the simulation of the one or more forces causing the plurality of nodes to become positioned in an overall layout such that the defined geographical area is substantially covered by the node ranges; and outputting feedback showing the overall layout of the plurality of nodes.

11. The one or more non-transitory computer-readable storage media of claim 10, the computer process further comprises:

assigning a channel to each of the plurality of nodes based on the overall layout of the plurality of nodes such that each of the plurality of nodes is assigned a different channel than neighboring nodes.

12. The one or more non-transitory computer-readable storage media of claim 11, wherein the feedback is output onto a graphical user interface and each of the assigned channels is represented by a different color.

13. The one or more non-transitory computer-readable storage media of claim 10, wherein the existing network paths includes existing optic-fiber cabling and the potential network paths includes new optic-fiber cabling and point-to-point connections.

14. The one or more non-transitory computer-readable storage media of claim 10, wherein the boundary information includes primary boundary segment information corresponding to a particular geographical area.

15. The one or more non-transitory computer-readable storage media of claim 14, wherein the boundary information includes at least one of: secondary boundary information defining secondary geographical areas within the particular geographical area which are excluded from coverage; and tertiary boundary information defining tertiary geographical areas to which coverage is provided outside of the particular geographical area.

16. The one or more non-transitory computer-readable storage media of claim 14, wherein the particular geographical area is a metropolitan city.

\* \* \* \* \*